United States Patent [19]

Naito et al.

[11] Patent Number: 4,996,595
[45] Date of Patent: Feb. 26, 1991

[54] FLICKER REDUCTION APPARATUS

[75] Inventors: Hidefumi Naito, Kanagawa; Toshio Sarugaku, Chiba; Masaharu Tokuhara, Kanagawa, all of Japan

[73] Assignee: Sony Corporation, Tokyo, Japan

[21] Appl. No.: 419,901

[22] Filed: Oct. 11, 1989

[30] Foreign Application Priority Data

Oct. 13, 1988 [JP] Japan ............................. 63-258290
Oct. 21, 1988 [JP] Japan ............................. 63-265784
Jan. 30, 1989 [JP] Japan ............................. 1-20431

[51] Int. Cl.$^5$ ......................... H04N 5/06; H04N 3/00
[52] U.S. Cl. ............................... 358/150; 358/140; 358/166
[58] Field of Search ............... 358/150, 148, 152, 151, 358/140, 166

[56] References Cited

U.S. PATENT DOCUMENTS

| | | | |
|---|---|---|---|
| 4,524,387 | 6/1985 | Tamer | 358/154 |
| 4,616,260 | 10/1986 | Erwin | 358/150 |
| 4,617,594 | 10/1986 | Katagiri | 358/150 |
| 4,668,974 | 5/1987 | Kita | 358/150 |
| 4,800,429 | 1/1989 | Perkins | 358/148 |

*Primary Examiner*—Tommy P. Chin
*Attorney, Agent, or Firm*—Alvin Sinderbrand; William S. Frommer

[57] ABSTRACT

Intermediate vertical synchronizing signals are generated to occur between the vertical synchronizing signals normally included in a conventional video signal. A first counter counts clock signals which are synchronized with the horizontal synchronizing signals normally included in the conventional video signal to provide a count representing the number of clock signals which are present in one-half of a field interval of that conventional video signal. The count provided by the first counter during the second preceding field interval is temporarily stored and compared to a count produced by a second counter which counts the clock signals from the beginning of the field interval. An intermediate vertical synchronizing signal is generated when the count of the second counter is equal to the stored count.

22 Claims, 7 Drawing Sheets

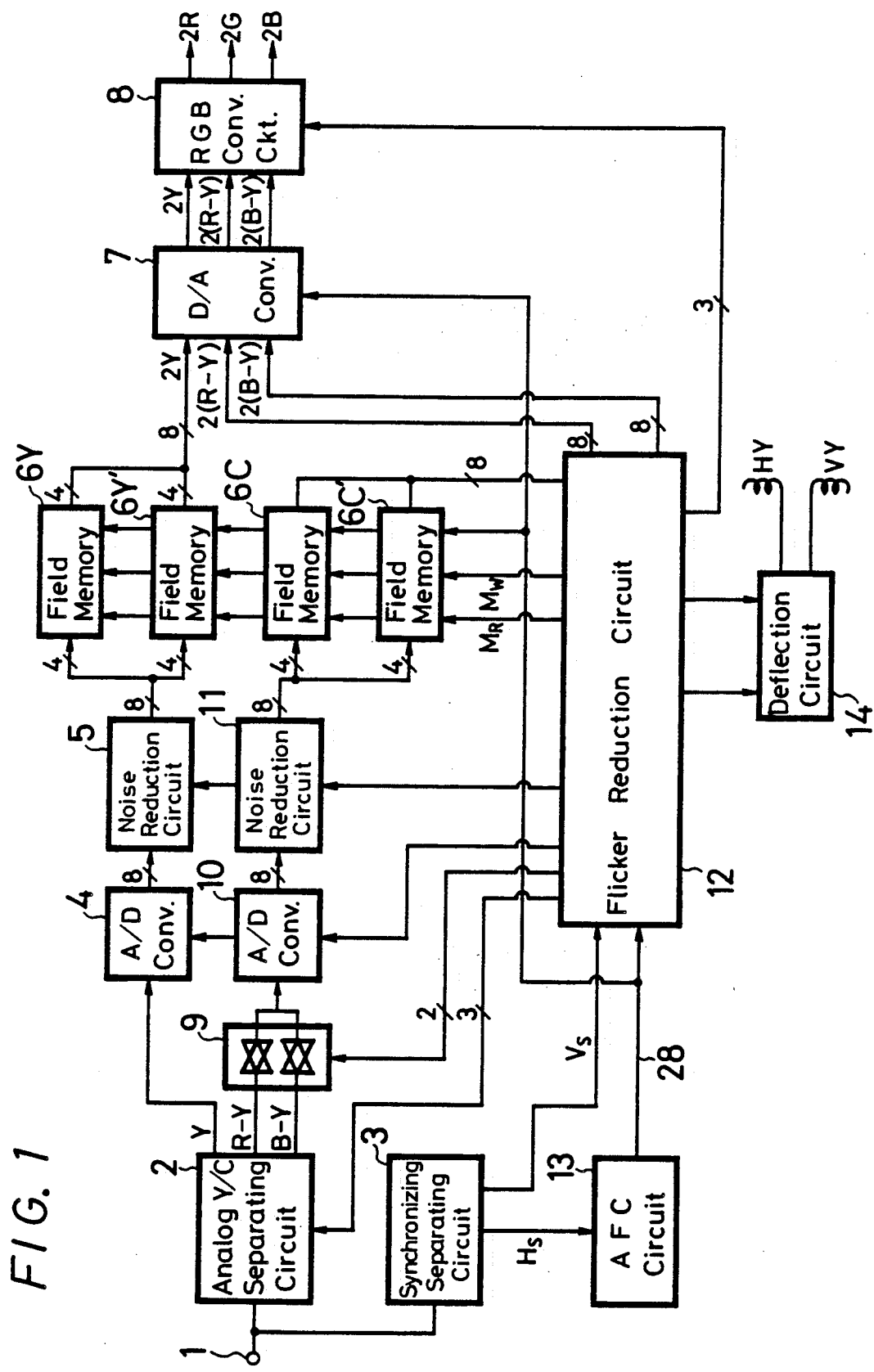

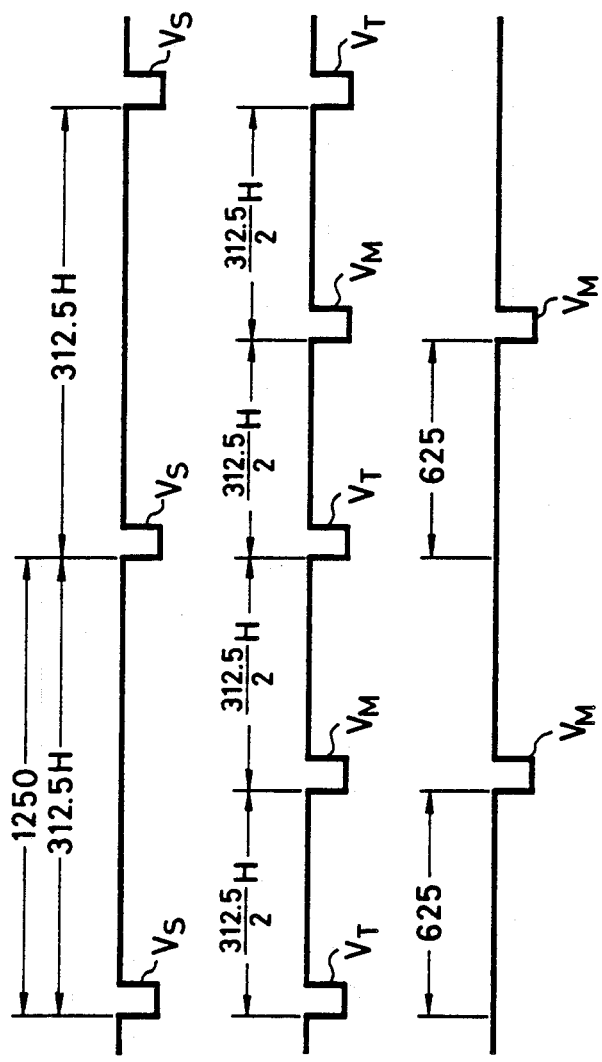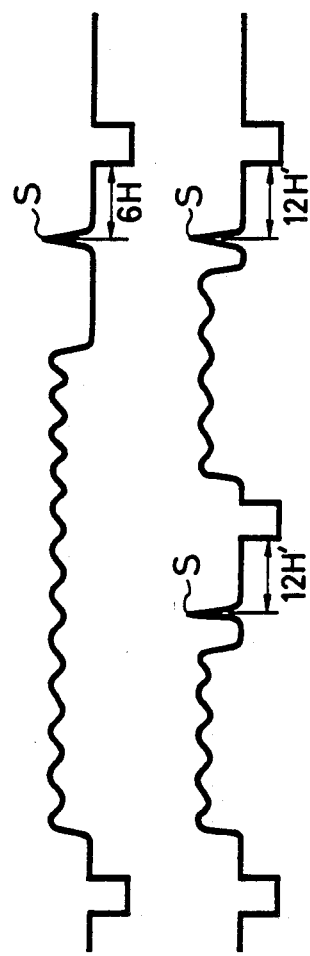

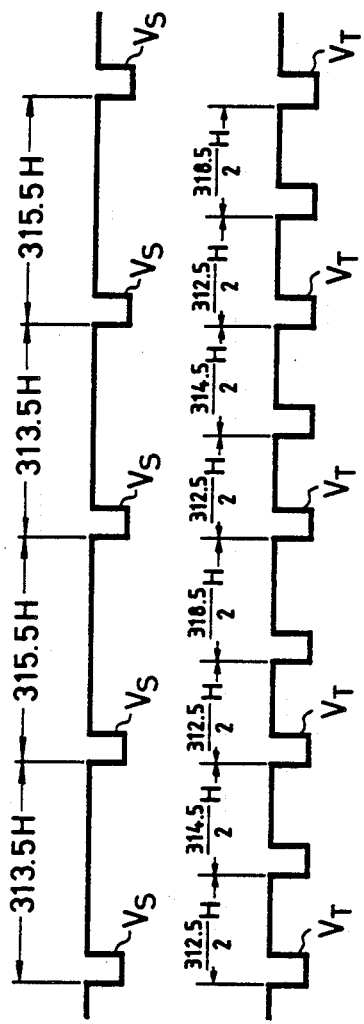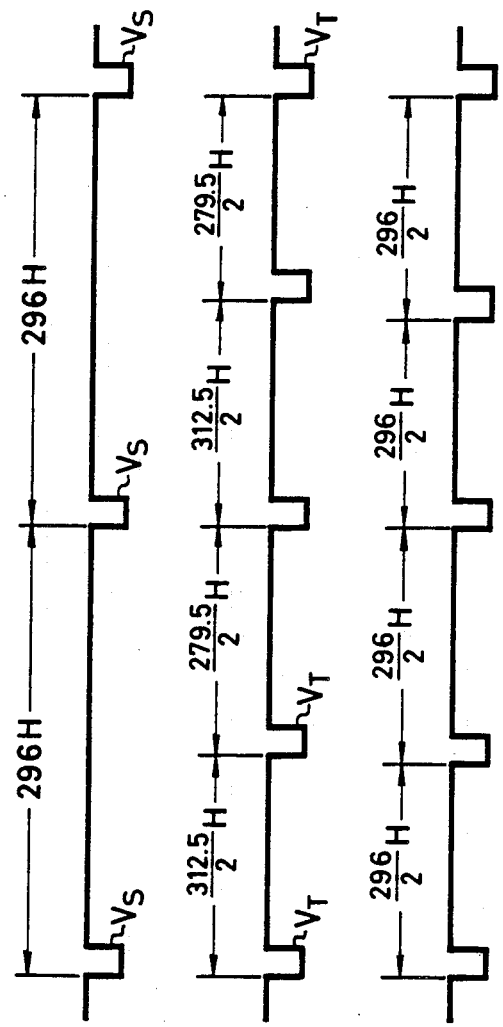
FIG. 5A
FIG. 5B
FIG. 6A
FIG. 6B
FIG. 6C

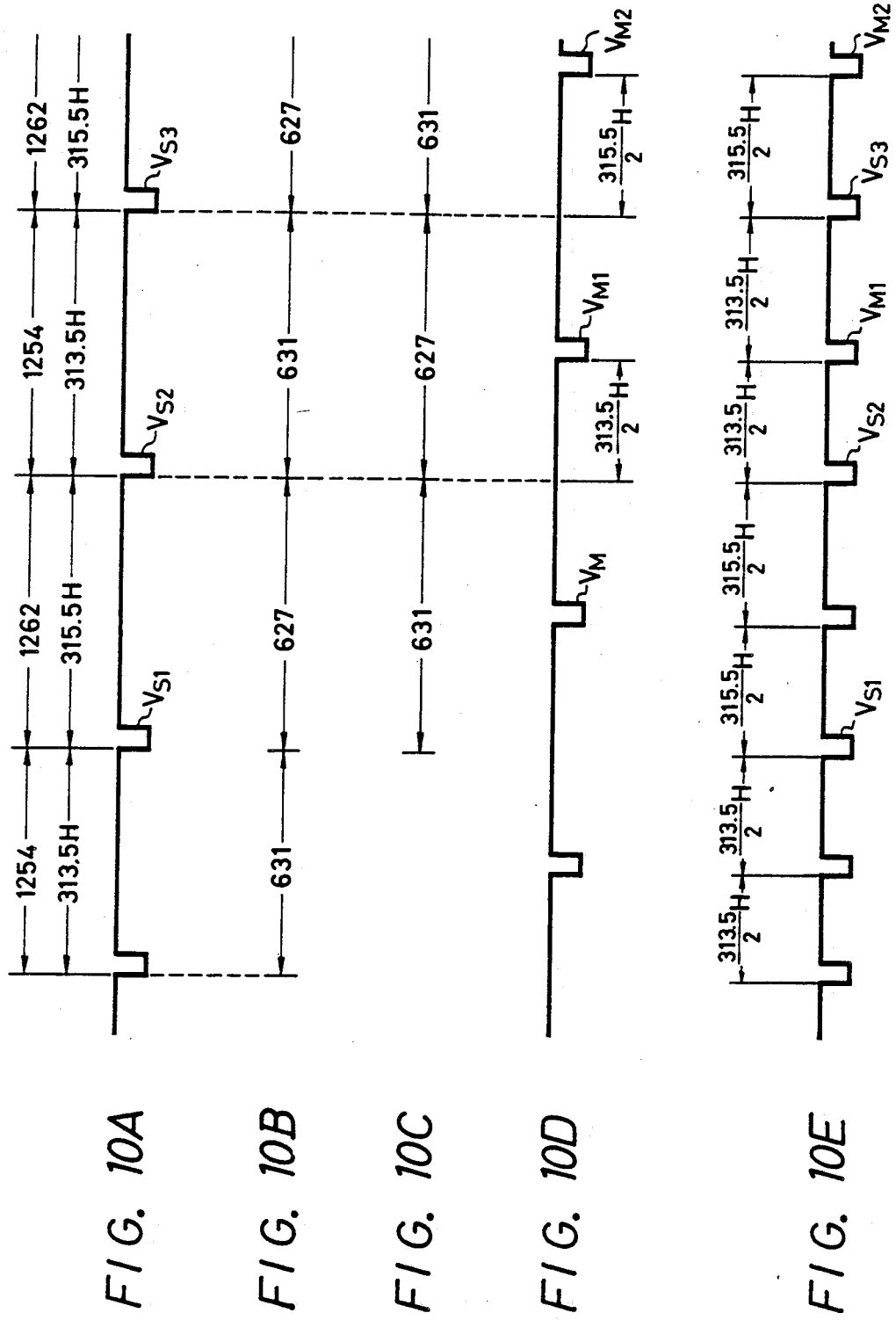

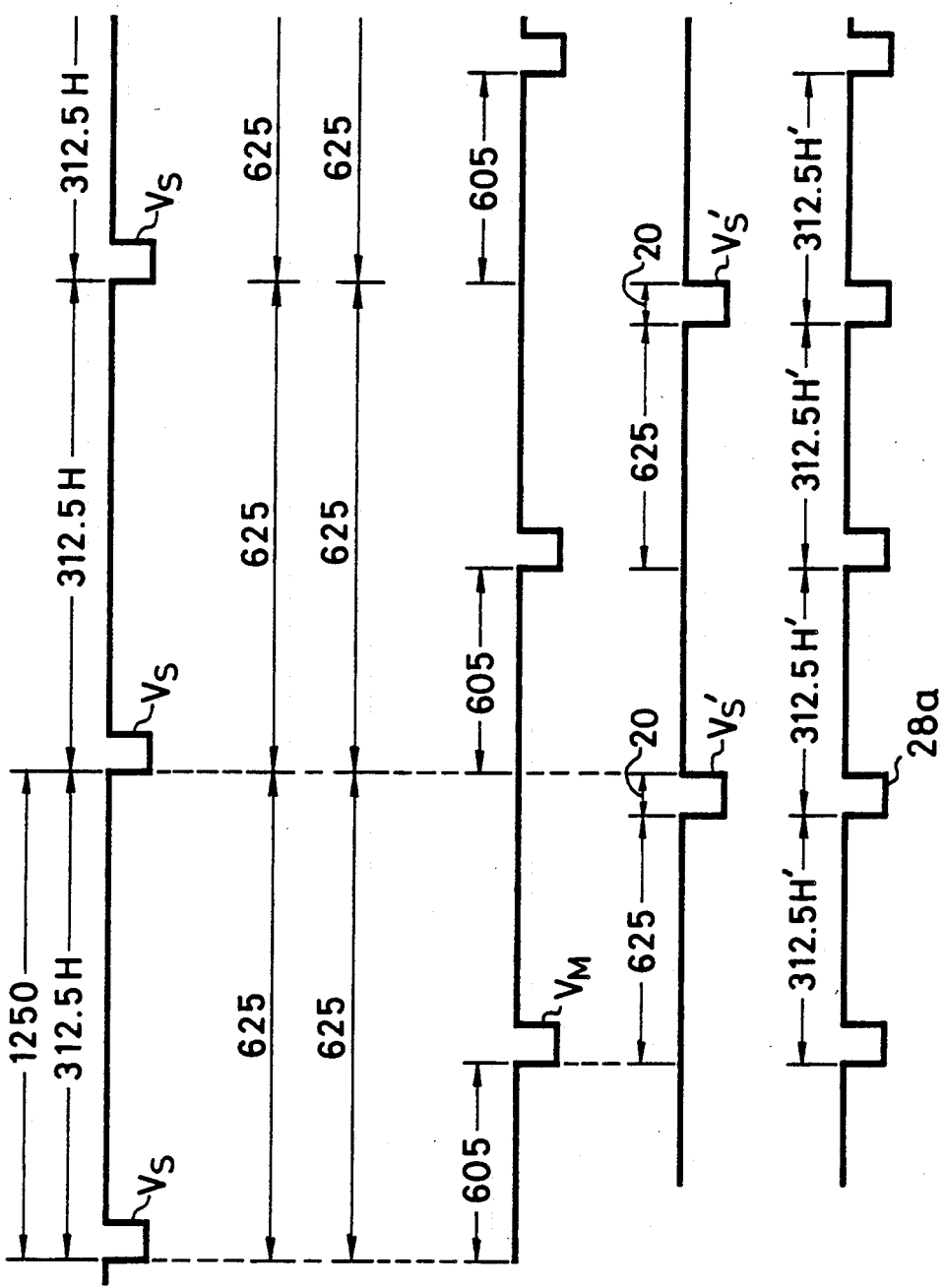

FLICKER REDUCTION APPARATUS

BACKGROUND OF THE INVENTION

1. Field of the Invention

This invention relates to flicker reduction for application with signals played back by a digital video tape recorder and, more particularly, to a technique for reducing flicker which otherwise would be disturbingly present in a television picture displayed on a large screen display in response to a conventional video signal, such as a PAL or SECAM television signal that may be reproduced.

2. Description of the Prior Art

Color television signals typically are transmitted with field intervals having the repetition rate of 60 Hz or 50 Hz. Typical of the former is the NTSC television signal and typical of the latter are the PAL and SECAM television signals. Although not easily discernible in television pictures displayed from those television signals having the 60 Hz field repetition rate, it has been found that when a video picture is displayed on a large screen display in response to a PAL or SECAM signal, flicker becomes conspicuous. Such flicker is annoying and degrades the overall quality of the displayed large-screen picture. Flicker reduction apparatus has been proposed in which the field repetition rate of the color video signal is doubled, thereby displaying one hundred frames per second rather than the conventional fifty frames per second.

Of course, the doubled field repetition rate must be synchronized with the conventional field repetition rate. In the aforementioned proposal, the beginning of a field interval is detected, as by sensing the usual vertical synchronizing signal, and then an intermediate vertical synchronizing signal is generated after a predetermined number of line intervals in the field have been sensed or, alternatively, after a predetermined amount of time (equal to one-half the field interval) has passed, as shown in FIGS. 4A and 4B. While this proposal is satisfactory for television signals having fixed, uniform field intervals, such as broadcast television signals or signals' reproduced during the "normal" playback operation of a video recorder, difficulties are encountered when the reproduced field intervals are not uniform.

For example, if a video recorder is operated in a special playback mode, such as slow motion or still motion playback, the reproduced vertical synchronizing signal is not uniform. As a numerical example, the field interval of a PAL or SECAM television signal is equal to 312.5 horizontal line intervals, or 312.5H. In the aforementioned special playback mode, the reproduced field intervals may vary in duration such that, in sequence, those field intervals are 313.5H, 315.5H, 313.5H, 315.5H, and so on, as shown in FIG. 5A. In the flicker reduction proposal mentioned above, the intermediate vertical synchronizing signal is generated at a time corresponding to one-half the conventional field interval. Thus, the intermediate vertical synchronizing signal is generated at 312.5(H)/2. As a result, the field interval of 313.5H is divided into two subfield intervals of 312.5(H)/2 and 314.5(H)/2. Likewise, if the reproduced field interval during the special playback mode exhibits a duration of 315.5H, the intermediate vertical synchronizing signal is generated after one-half the duration of the conventional field interval, or after 312.5(H)/2, resulting in the next subfield interval having a duration of 318.5(H)/2. Thus, although the field repetition rate of the flicker-reduced video signal is twice the field repetition rate of the original, reproduced video signal, the so-called double field intervals are not uniform, as shown in FIG. 5B. This non-uniformity in the double field vertical synchronizing signals for the flicker-reduced television signals causes vertical jitter.

A similar disadvantage occurs when a video recorder is operated in a forward or reverse picture scan mode. For example, and with reference once again to the PAL or SECAM television signal, operation of a video recorder in its forward picture scan mode may result in video signals having field intervals on the order of 296H, as shown in FIG. 6A. In accordance with the flicker reduction proposal mentioned above, an intermediate vertical synchronizing signal is produced at a location corresponding to one-half the conventional field interval, or after 312.5(H)/2. As a result, the next-following subfield interval is substantially reduced and is equal to 279.5(H)/2. Thus, the flicker-reduced video signal having the double field repetition rate is provided with sequential field intervals of durations 312.5(H)/2, 279.5(H)/2, 312.5(H)/2, 279.5(H)/2, and so on, as shown in FIG. 6B. When the video recorder is operated in its reverse picture scan mode, the durations of the field intervals of the reproduced PAL or SECAM video signals are on the order of about 330H, as depicted in FIG. 7A. Using the aforementioned flicker reduction proposal, the intermediate vertical synchronizing signal is produced after a duration of 312.5(H)/2, and the next subfield admits of a duration equal to 347.5(H)/2, as shown in FIG. 7B. Hence, the flicker-reduced video signal exhibits the double field repetition rate with successive subfield intervals equal to 312.5(H)/2, 347.5(H)/2, 312.5(H)/2, 347.5(H)/2, and so on. (It will be appreciated that the term "subfield" refers to an interval which, in the flicker-reduced video signal having twice the field repetition rate, contains a full field of video information.)

In the forward and reverse picture scan modes, the drastically changing duration of successive subfield intervals results in considerable vertical jitter.

Another difficulty is found when using the aforementioned jitter reduction technique. As is usual in video signal playback devices, when the scanning of the record medium is changed over from one transducer, or head, to another, a head-switching signal is superimposed onto the video signal. This head-switching signal is illustrated in FIG. 8A as signal S and normally is disposed in that portion of a field interval in which useful video information is not present. This non-video portion is referred to as the overscan area. Hence, the presence of the superimposed head-switching signal S is not viewed. In the aforementioned flicker reduction proposal, the video information included in a conventional, or reproduced field is repeated in two successive subfields of the flicker-reduced video signal, such as shown in FIG. 8B. Now, however, the head-switching signal which is superimposed onto the flicker-reduced video signal is located at substantially the same position (relative to the real time axis) as was the head-switching signal in the reproduced video signal. Since the flicker-reduced video signal exhibits a field repetition rate that is twice that of the originally reproduced video signal and, thus, exhibits a field interval that is one-half that of the original, the location of the head-switching signal S in the flicker-reduced video signal precedes the vertical synchronizing signal by twice the number of line intervals included in the flicker-reduced video signal. For example, if a head-switching signal S preceded the vertical synchronizing signal by six line intervals (6H) in the original video signal, as shown in FIG. 8A, the head-switching signal superimposed onto the flicker-reduced video signal now precedes the vertical synchronizing signal by twelve line intervals 12H'. (It is recognized that the duration of a line interval H' in the flicker-reduced video signal is one-half the duration of the line interval H in the original video signal.) This head-switching signal S now occurs in a line interval containing useful video information. That is, the head-switching signal no longer is concealed in the overscan area of the video signal but, rather, produces noise and distortion in the displayed television picture.

OBJECTS AND SUMMARY OF THE INVENTION

Therefore, it is an object of the present invention to provide improved flicker reduction apparatus which avoids the aforenoted defects and disadvantages found in previous proposals.

Another object of this invention is to provide a technique for reducing line flicker in a video signal that is reproduced from a video recorder and displayed on a television receiver, such as a large-screen display.

A further object of this invention is to provide a flicker reduction technique which avoids or minimizes vertical jitter that may be present in a video signal reproduced from the video recorder operating in a special playback mode, such as slow motion, still motion, and the like.

An additional object of this invention is to provide a flicker reduction technique which reduces vertical jitter in a video signal reproduced from a video recorder that is operated in a forward or reverse picture scan mode.

Still another object of this invention is to provide a flicker reduction technique in which a head-switching signal that may be induced during head-changeover in a video tape recorder is prevented from being positioned in the useful picture area of the video signal, thereby improving the quality of the video picture which is reproduced.

Yet a further object of this invention is to provide a flicker reduction technique in which a flicker-reduced video signal exhibits a double field repetition rate with each subfield exhibiting substantially uniform duration, thereby avoiding or at least substantially minimizing vertical jitter and head-switching noise in the video picture which ultimately is displayed from the flicker-reduced video signal.

Various other objects, advantages and features of the present invention will become readily apparent from the ensuing detailed description, and the novel features will be particularly pointed out in the appended claims.

In accordance with this invention, intermediate vertical synchronizing signals are generated to occur between the vertical synchronizing signals which normally are included in a conventional video signal. A first counter counts clock signals which are synchronized with the horizontal synchronizing signals included in the conventional video signal to provide a count representing the number of clock signals which are present in one-half of a field interval defined by the vertical synchronizing signals. The count provided by the first counter during the second preceding interval is temporarily stored and compared to a count produced by a second counter which counts the clock signals included in the present field interval. When the count of the second counter equals the stored count, the intermediate vertical synchronizing signal is generated.

As a feature of this invention, the first counter is enabled by a vertical synchronizing signal to count the clock signals, and the temporary storage device includes a load input which responds to a vertical synchronizing signal to store the count derived from the first counter. As one aspect of this feature, the first counter is formed as an n-bit counter and the temporary storage device receives an (n−1) bit count from that counter, wherein the (n−1) bit count is equal to the n-bit count less the least significant bit of the latter.

As another aspect of this feature, the temporary storage device comprises a first latch circuit responsive to the vertical synchronizing signal to store the count then reached by the first counter, and a second latch circuit responsive to the vertical synchronizing signal to store the count which had last been stored in the first latch circuit. It is the count stored in this second latch circuit that is compared to the count of the second counter.

As another feature of this invention, the second counter includes a count offset by which the number of clock signals counted thereby is offset from the actual number, whereby the comparator generates an intermediate vertical synchronizing signal offset from the middle of a conventional field interval when the offset count of this counter equals the temporarily stored count. As an aspect of this feature, the second counter is cleared in response to this intermediate vertical synchronizing signal so as to provide a reset count from which clock signals are counted. As a result, when the count of this second counter next reaches the temporarily stored count, an offset vertical synchronizing signal is generated.

In a preferred embodiment, the second counter is comprised of two sub-counters, with the first sub-counter being loaded with a preset count in response to a vertical synchronizing signal, from which preset count the clock signals are counted. The second sub-counter is reset in response to the intermediate vertical synchronizing signal, from which the clock signals are counted. Consistent with this embodiment, a first comparator functions to compare the count of the first sub-counter with the temporarily stored count for generating an intermediate offset vertical synchronizing signal, and a second comparator functions to compare the count of the second sub-counter with the temporarily stored count for generating an offset vertical synchronizing signal. These offset vertical synchronizing signals tend to conceal a head-switching signal which may be present in the flicker-reduced video signal, thereby avoiding noise, distortion or interference in the picture displayed therefrom.

BRIEF DESCRIPTION OF THE DRAWINGS

The following detailed description, given by way of example, will best be understood in conjunction with the accompanying drawings in which:

FIG. 1 is a block diagram of previously proposed flicker reduction apparatus in which the present invention finds ready application;

FIGS. 4A-4C are waveform diagrams showing the relationship of conventional and double-rate vertical synchronizing signals;

FIGS. 5A and 5B are waveform diagrams which show the relationship between conventional and double-rate vertical synchronizing signals produced during a special video playback mode, such as slow motion or still motion;

FIGS. 6A-6C are waveform diagrams which illustrate the relationship between conventional and double-rate vertical synchronizing signals produced during a forward picture scan of recorded video signals;

FIGS. 8A and 8B are waveform diagrams which illustrate the locations of head-switching signals S in conventional and double-rate field intervals;

FIGS. 10A-10E are waveform diagrams which are useful in understanding the operation of the embodiment shown in FIG. 9;

FIGS. 12A-12F are waveform diagrams which are useful in understanding the operation of the embodiment shown in FIG. 11.

DETAILED DESCRIPTION OF CERTAIN PREFERRED EMBODIMENTS

Figure 2A:
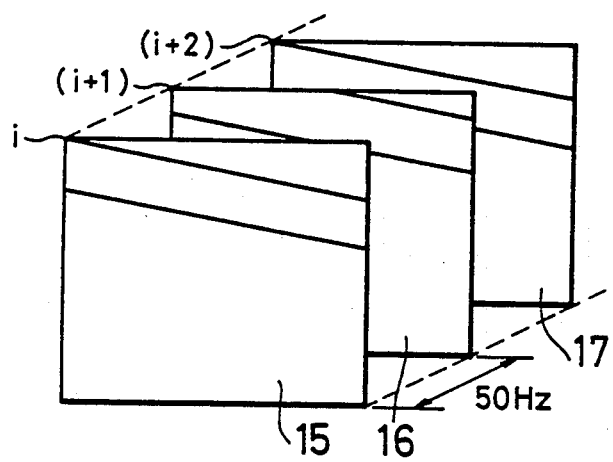
FIGS. 2A and 2B are schematic representations of successive fields of horizontal lines and are useful in explaining flicker.

Before describing the present invention, reference is made to FIG. 1 which illustrates, in block diagram form, a proposal for flicker reduction in, for example, a PAL or SECAM television system. Although the illustrated apparatus may be used with the NTSC signal, for convenience, it is described herein in conjunction with a video signal whose field repetition rate is on the order of 50 Hz, thereby providing fifty field intervals per second.

The video signal typically is reproduced from a record medium, such as by a video tape recorder which may be operated in normal, special or scan reproduction modes. The reproduced video signal is supplied from an input terminal 1 to an analog luminance/chrominance (Y/C) separating circuit 2. This circuit is conventional and separates the reproduced video signal into its luminance component Y and its color difference components R-Y and B-Y, wherein R represents a red video signal and B represents a blue video signal.

The input video signal also is supplied to a synchronizing separating circuit 3 which separates the usual horizontal synchronizing signals $H_s$ and vertical synchronizing signals $V_s$ from the composite video signal. The separated horizontal synchronizing signal $H_s$ is supplied to an automatic frequency control (AFC) circuit 13 which generates a clock signal whose frequency is a multiple of the line interval repetition rate represented by the horizontal synchronizing signal. This clock signal is supplied to a flicker reduction circuit 12 together with the separated vertical synchronizing signal $V_s$.

The luminance component Y produced by Y/C separating circuit 2 is digitized by an analog-to-digital (A/D) converter 4. As a numerical example, the digitized luminance signal is represented as an 8-bit signal and is supplied to a noise reduction circuit 5. Following noise reduction, the digitized luminance signal, which continues to be shown as an 8-bit sample, is stored in field memories 6Y and 6Y'. As a cost saving, each field memory is adapted to store a 4-bit digital sample such that each 8-bit noise reduced digitized luminance sample is stored with four of its more significant bits in field memory 6Y and with the remaining four lesser significant bits in field memory 6Y'. These digitized samples are written into the field memories in response to a write clock $M_W$.

The color difference signals R-Y and B-Y produced by Y/C separating circuit 2 are serialized by an analog switch 9 to form alternate color difference signals in series, such as R-Y, B-Y, R-Y, B-Y, and so on. This serialized chrominance data is digitized by A/D converter 10 to produce, for example, 8-bit chrominance samples. These chrominance samples are supplied to field memories 6C and 6C' by a noise reduction circuit 11. As was the case for the luminance field memories 6Y and 6Y', the chrominance field memories 6C and 6C' are adapted to store the four more significant bits of each chrominance sample in field memory 6C and the four lesser significant bits in field memory 6C'. Here too, the chrominance samples are written into the field memories under the control of write clock $M_W$.

The luminance samples stored in field memories 6Y and 6Y' are read out therefrom under the control of a read clock $M_R$ to digital-to-analog (D/A) converter 7. To reduce flicker, the samples are read at a read-out rate which is twice the frequency of the write-in rate. Thus, during the interval normally occupied by a single, conventional horizontal line, two line intervals may be read from the field memories. Preferably, the same line interval is read twice. Thus, it is seen that during a conventional field interval, two field intervals are read from field memories 6Y and 6Y'. That is, the same field interval is read twice. To represent this double rate field interval, that is, to represent the field intervals read from field memories 6Y and 6Y' having twice the conventional field repetition rate, the read-out luminance samples are identified as 2Y.

Likewise, the red color difference samples and blue color difference samples stored in field memories 6C and 6C' are read out under the control of read clock $M_R$ at twice the write-in rate. These 8-bit samples, which are read out at field intervals whose repetition rate is twice the conventional field repetition rate, are supplied to D/A converter 7 by way of flicker reduction circuit 12. The flicker reduction circuit serves to separate the serialized red and blue color difference samples which had been written into the field memory. Thus, and as illustrated, the red color difference signal is supplied to D/A converter 7 at twice the conventional field (and line) repetition rate and, thus, is designated 2(R-Y). The double rate blue color difference signal is supplied to the D/A converter and is designated 2(B-Y).

D/A converter 7 converts the digitized double-rate luminance component 2Y, red color difference component 2(R-Y) and blue color difference component 2(B-Y) to analog form and supplies these analog double-rate signals to an RGB converter 8. The RGB converter is conventional and converts the double-rate luminance and color difference components to red, green and blue double-rate video signals. These video signals exhibit twice the field (and line) repetition rate and, thus, are designated 2R, 2G and 2B.

Flicker reduction circuit 12 includes various switching circuits which respond to a clock signal generated by AFC circuit 13 and the separated vertical synchronizing signal $V_s$ to supply timing and switch control signals to Y/C separator 2, switch 9, A/D converters 4 and 10, noise reduction circuits 5 and 11 and RGB converter 8. The clock signal produced by AFC circuit 13 is supplied, in addition to flicker reduction circuit 12, to field memories 6Y, 6Y', 6C and 6C' and also to D/A converter 7 by way of conductor 28.

The flicker reduction circuit also generates horizontal and vertical deflection control signals which are supplied to deflection circuit 14 to determine the horizontal deflection signal HY and the vertical deflection signal VY by which the electron beams included in a color video display tube are scanned across the display surface of that tube. The manner in which the flicker reduction apparatus serves to reduce flicker in the displayed picture fields now will be explained by referring first to FIGS. 2A and 2B.

Figure 2B:
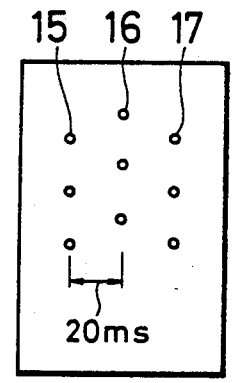

FIG. 2A is a schematic representation of the display of successive fields 15, 16 and 17 of line intervals. Field 15 is assumed to be the $i^{th}$ field, field 16 is assumed to be the (i+1)th field and field 17 is assumed to be the (i+2)th field. As shown, these field intervals repeat at the rate of 50 Hz; and the (i+1)th field 16 is interlaced between the $i^{th}$ field 15 and the (i+2)th field 17. A side view of the scan lines included in these successive fields 15, 16 and 17 is depicted in FIG. 2B. It is appreciated that, at the conventional field repetition rate of 50 Hz, field interval 16 is displayed 20 msec. after field interval 15. FIG. 2B illustrates the interlace relationship between the lines of field interval 16 and the lines of field interval 15. On a large screen display, the separation between adjacent interlaced lines is relatively large, and this coupled with the 20 msec. delay between energizing those lines gives rise to a conspicuous flicker effect.

Figure 3A:
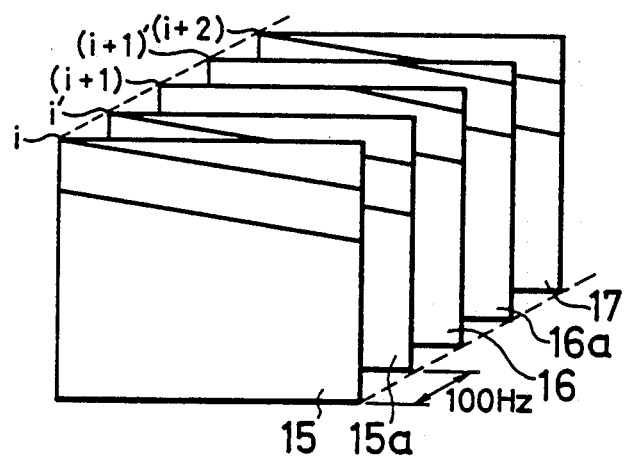
FIGS. 3A and 3B are schematic representations of successive field intervals having twice the field repetition rate of the field intervals shown in FIGS. 2A and 2B.
Figure 3B:
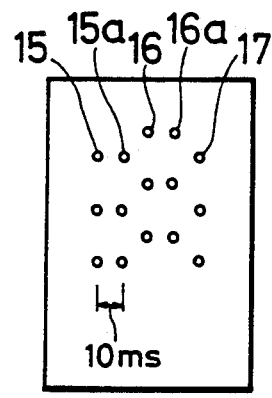

The aspect of flicker reduction circuit 12 which is pertinent to the present invention is the increase in the field repetition rate and the rate at which field memories 6Y, 6Y', 6C and 6C' are read out. As mentioned above, by doubling the readout rate relative to the write-in rate, the effective field repetition rate is doubled from 50 Hz to 100 Hz, as shown in FIG. 3A. Thus, during the interval of a conventional field period (i.e. 20 msec.), two field intervals are read out. More particularly, the same field interval is read out twice in 22 succession. Thus, and as shown in FIGS. 3A and 3B, the $i^{th}$ field interval is read twice as field intervals 15 and 15a, followed by reading the (i+1)th field interval twice, as represented by field intervals 16 and 16a, followed by reading the (i+2)th field interval twice, and so on. By doubling the rate at which the field intervals are read and displayed, the delay between successive energizations of scan lines is halved to 10 msec. By comparing FIGS. 3B and 2B, it is seen that, by doubling the vertical synchronizing frequency two field intervals are displayed in the period normally reserved for the display of a single field interval. By doubling the rate at which each line interval is energized, flicker is reduced.

As mentioned above, flicker reduction circuit 12 generates intermediate vertical synchronizing signals which are intended to occur at the center of a conventional field interval. FIG. 4A represents the field intervals defined by vertical synchronizing signals $V_s$ of a conventional PAL or SECAM television signal. Each field interval exhibits a duration equal to 312.5H, where H represents the duration of a horizontal line interval. (For the moment, the numerals written above the notation of the field duration 312.5H are not discussed.) Flicker reduction circuit 12 operates to generate intermediate vertical synchronizing signals $V_M$ at the completion of a half-field period 312.5(H)/2. For example, horizontal synchronizing pulses may be counted or a predetermined time delay may be provided in response to the occurrence of each vertical synchronizing signal $V_s$ in order to generate the intermediate vertical synchronizing signals $V_M$. During normal operation of the video recorder with which the apparatus shown in FIG. 1 is used, the intermediate vertical synchronizing signals $V_M$ occur at the mid-point of the conventional field interval. That is, each subfield which precedes and follows the intermediate vertical synchronizing signal $V_M$ is of equal duration 312.5(H)/2.

However, when the aforementioned technique used to produce vertical synchronizing signals of twice the conventional or repetition rate is applied to video signals which are played back as slow motion or still motion signals, that is, when the video recorder is operated in its so-called special playback mode, the resultant video signals appear as shown in FIG. 5B. Here, FIG. 5A illustrates non-uniformly spaced vertical synchronizing signals $V_s$ which are reproduced during, for example, slow motion or still motion playback, with each field interval being larger than a conventional field interval. Accordingly, when an intermediate vertical synchronizing signal is generated after a half-field duration of 312.5(H)/2, the reproduced field interval is divided into two unequal subfields, as shown in FIG. 5B. Thus, the vertical synchronizing signals of twice the conventional repetition rate are spaced apart by the intervals: 312.5(H)/2, 314.5(H)/2, 312.5(H)/2, 318.5(H)/2, and so on. These irregularly spaced vertical synchronizing signals produce undesired vertical jitter in the displayed video picture.

Vertical jitter also is produced in the video picture which is displayed from video signals that are played back during forward or reverse scanning operations when the aforementioned flicker reduction technique is used. FIG. 6A illustrates the spacing of vertical synchronizing signals $V_s$ which are played back during a forward scan mode. Here, the field intervals are reduced in duration to 296(H), as shown in FIG. 6A. When the aforementioned technique is used to generate an intermediate vertical synchronizing signal after a half-field period of 312.5(H)/2, the next-occurring vertical synchronizing signal is spaced apart by the interval 279.5(H)/2, which is substantially less than a half-field interval. As illustrated in FIG. 6B, the vertical synchronizing signals which are produced at twice the conventional field repetition rate of FIG. 6A are spaced apart by the intervals 312.5(H)/2, 279.5(H)/2, 312.5(H)/2, 279.5(H)/2, and so on.

Figure 7A:
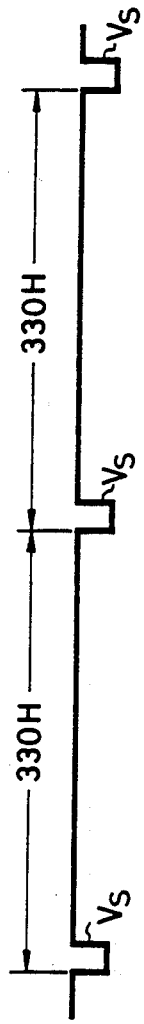
FIGS. 7A-7C are waveform diagrams which illustrate the relationship between conventional and double-rate vertical synchronizing signals which are produced when previously recorded video signals are reproduced in a reverse picture scan mode.
Figure 7B:
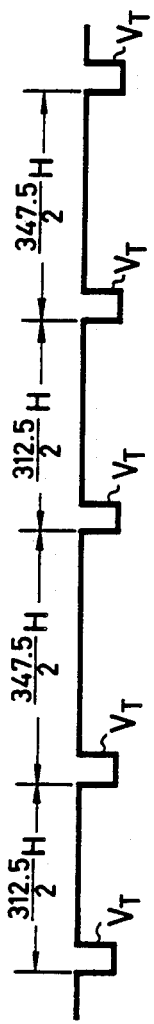

FIG. 7A illustrates the vertical synchronizing signals $V_s$ which are produced when the video recorder operates in its reverse scan mode, these vertical synchronizing signals being spaced apart by the interval 330H. When the flicker reduction technique described above is used to produce vertical synchronizing signals of twice the conventional field repetition rate, the resultant double-rate vertical synchronizing signals are as shown in FIG. 7B. Now, the double-rate vertical synchronizing signals are spaced apart by the sequential periods 312.5(H)/2, 347.5(H)/2, 312.5(H)/2, 347.5(H)/2, and so on.

FIGS. 6B and 7B illustrate that, during forward or reverse scan modes of operation, the flicker-correcting vertical synchronizing signals $V_T$ are irregularly spaced, resulting in conspicuous vertical jitter in the displayed flicker-reduced video picture.

FIGS. 8A and 8B illustrate the presence of head-switching pulses S which are disposed in the picture display portion of each sub-field (FIG. 8B) of the flicker-reduced video signal. These head-switching signals, which are concealed when an uncorrected video signal is displayed, result in interference, noise and distortion when the flicker-reduced video signal of twice the conventional field repetition rate is displayed. FIGS. 8A and 8B have been discussed above and are not further explained herein.

Figure 9:
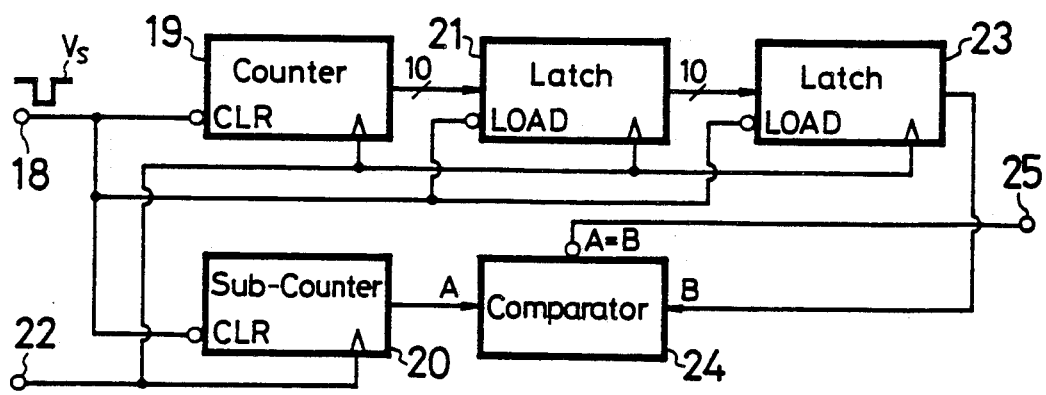
FIG. 9 is a block diagram of one embodiment of the present invention by which vertical synchronizing signals of twice the conventional field repetition rate are produced.

One embodiment of flicker reduction apparatus by which intermediate vertical synchronizing signals are generated is illustrated in FIG. 9. The intermediate vertical synchronizing signals generated by this circuit occur at the center of a conventional field interval, regardless of the operating mode of the video recorder used to play back the video signal. Thus, vertical synchronizing signals of twice the conventional repetition rate are produced as substantially regular, uniform signals regardless of whether the video recorder operates in its normal mode, slow motion or still motion mode, forward scan or reverse scan mode, or any other special reproduction mode.

The apparatus shown in FIG. 9 is comprised of a counter 19, a temporary storage circuit illustrated herein as series-connected latch circuits 21 and 23, another counter 20 and a comparator 24. Counter 19 includes a clear, or reset input connected to an input terminal 18 to which vertical synchronizing signals $V_s$ are applied. This counter also includes a clock input coupled to a clock terminal 22 for receiving clock signals from a suitable source, such as AFC circuit 13 (shown in FIG. 1). In one example, the repetition rate of the clock signals supplied to clock terminal 22 is equal to $4f_H$, where $f_H$ is the horizontal synchronizing frequency of the video signal.

In one embodiment, counter 19 is an n-bit counter, such as an 11-bit counter, of which (n−1) bits are supplied to the temporary storage circuit formed of latch circuits 21 and 23. In this embodiment, all but the least significant bit of counter 19 are supplied to the temporary storage circuit. Those of ordinary skill in the art will appreciate that this (n−1) count provided by counter 19 is one-half the value of the n-bit count. Thus, a count representing half the number of clock signals supplied to and counted by counter 19 is applied to the temporary storage circuit.

Latch circuit 21 is a conventional storage device adapted to store the (n−1) bit count supplied thereto by counter 19. The latch circuit includes a LOAD input coupled to input terminal 18 and responds to a vertical synchronizing signal $V_s$ to store the (n−1) bit count then provided by counter 19. For example, the count provided by counter 19 is loaded into latch circuit 21 in response to the negative transition of vertical synchronizing signal $V_s$. For synchronization, latch circuit 21 includes a clock input coupled to clock terminal 22.

Latch circuit 23 may be substantially identical to latch circuit 21 and includes a LOAD input coupled to input terminal 18 and a clock input coupled to clock terminal 22. Latch circuit 23 receives the contents of latch circuit 21 and stores such contents in response to the negative transition of the vertical synchronizing signal $V_s$. Although not shown, suitable techniques may be used to prevent any race conditions between the transfer of the count of counter 19 to latch circuit 21 and the transfer of the contents of latch circuit 21 to latch circuit 23. For example, latch circuit 23 may be triggered in response to the negative transition of a clock signal and latch circuit 21 may be triggered in response to the positive transition of a clock signal.

Counter 20 is similar to counter 19 and includes a clear, or reset terminal coupled to input terminal 18 and a clock input coupled to clock terminal 22. Counter 20 is adapted to count clock signals and is periodically reset in response to the vertical synchronizing signal $V_s$.

Comparator 24 is coupled to counter 20 and to latch circuit 23. The comparator is adapted to sense when count A reached by counter 20 is equal to count B stored in latch circuit 23. When these counts are substantially equal (A=B), the comparator supplies an output pulse to output terminal 25. This output pulse comprises the intermediate vertical synchronizing signal $V_M$.

The manner in which the apparatus illustrated in FIG. 9 operates when supplied with a video signal reproduced by a video recorder operating in its normal playback mode now will be described in conjunction with FIGS. 4A and 4C. FIG. 4A illustrates the duration between vertical synchronizing signal $V_s$ equal to 312.5 line intervals. Since the clock signal supplied to clock terminal 22 exhibits a frequency $4f_H$, it is appreciated that 1250 clock signals are generated during a normal field interval. Counter 19 thus counts 1250 clock signals between successive vertical synchronizing signals, this counter being reset in response to each vertical synchronizing signal.

When 1250 clock signals have been counted by counter 19, a count equal to 625 that is, half the accumulated count, is transferred to latch circuit 21 in response to the next-following vertical synchronizing signal $V_s$. For example, counter 19 may accumulate an 11-bit count equal to [10011100010]. This count, less its least significant bit is transferred to latch circuit 21 as a count equal to [1001110001] which, in binary notation, is a count of 625.

Following the transfer of the count derived from counter 19 to latch circuit 21, the counter once again counts the clock signals supplied thereto. In response to the next vertical synchronizing signal $V_s$, the count which had been stored in latch circuit 21, that is, the count of 625, is transferred to latch circuit 23 and then a count derived from the latest count reached by counter 19 is loaded into latch circuit 21. Assuming that counter 19 is incremented during a presently received field interval, the count stored in latch circuit 21 is a count obtained during the next preceding field interval and the count stored in latch circuit 23 is the count obtained during the second preceding field interval. Thus, and with reference to FIG. 2B, if counter 19 is incremented during field interval 15, then the count stored in latch circuit 21 is the count which was obtained during preceding field interval 16 and the count stored in latch circuit 23 is the count obtained during second preceding field interval 17.

Counter 20 counts clock signals concurrently with counter 19. When this count A of counter 20 reaches 625, the stored count B, comparator 24 senses that A=B or A=625. Thus, when the count reached by counter 20 is equal to one-half the count which had been reached by counter 19 during the second preceding field interval, comparator 24 produces the intermediate vertical synchronizing signal $V_M$ as shown in FIG. 4C.

The foregoing operation is repeated, resulting in the generation of intermediate vertical synchronizing signal $V_M$ during each field interval. This intermediate vertical synchronizing signal is generated when a duration equal to one-half the second preceding field interval has been counted by counter 20.

Although not shown, output terminal 25 and input terminal 18 may be coupled to a suitable mixing circuit by which the received vertical synchronizing signals $V_s$ and the intermediate vertical synchronizing signals $V_M$ are mixed to form a stream of vertical synchronizing signals whose repetition rate is twice the conventional field repetition rate. These vertical synchronizing signals are uniform and equally spaced, and appear as shown in FIG. 4B.

Let it be assumed that the vertical synchronizing signals $V_s$ are obtained from a video signal reproduced by a video recorder operating in its still motion or slow motion mode. As was discussed above in conjunction with FIG. 5A, the resulting vertical synchronizing signals $V_s$ are spaced apart by nonuniform, varying intervals, and these varying intervals are shown once again in FIG. 10A. Thus, the field intervals exhibit durations of 313.5H, 315.5H, 313.5H, 315.5H, and so on. Counter 19 counts the clock signals of frequency $4f_H$ such that, at the completion of one field interval, defined by vertical synchronizing signal $V_{s1}$, the counter has accumulated a count of 1254. Latch circuit 21 responds to vertical synchronizing signal $V_{s1}$ to store a count equal to one-half the accumulated count. As shown in FIG. 10B, vertical synchronizing signal $V_{s1}$ loads the count of 627 into latch circuit 21. At this time, counter 19 is reset and commences its counting cycle once again.

At the end of the next-following field interval defined by vertical synchronizing signal $V_{s2}$, the count (627) stored in latch circuit 21 is transferred to latch circuit 23 (FIG. 10C) and then one-half the count reached by counter 19 is loaded into latch circuit 21. The loading of this half count (631) is represented in FIG. 10B. Counter 19 is reset and again commences its counting operation.

Thus, FIG. 10A represents the counts reached by counter 19 at the occurrence of vertical synchronizing signal $V_{s1}$, $V_{s2}$ and $V_{s3}$. FIG. 10B represents the counts stored in latch circuit 21 22 at the times that vertical synchronizing signals $V_{s1}$, $V_{s2}$ and $V_{s3}$ are produced. FIG. 10C represents the counts transferred to and stored in latch circuit 23 in response to the vertical synchronizing signals $V_{s1}$, $V_{s2}$ and $V_{s3}$.

FIG. 10D illustrates the intermediate vertical synchronizing signal $V_M$ produced by comparator 24 when the count reached by counter 20 is equal to the count stored in latch circuit 23. It is seen that when the count of counter 20 is equal to one-half the count attained by counter 19 during the second preceding field interval, an intermediate vertical synchronizing signal is generated. During the first field interval illustrated in FIG. 10A, the count stored in latch circuit 23 is equal to 627. When counter 20 reaches this count, the intermediate vertical synchronizing signal is produced. Since the repetition rate of the clock signals is $4f_H$, a count of 627 is equal to an interval of 313.5(H)/2.

During the next field interval, commencing with vertical synchronizing signal $V_{s1}$, when counter 20 reaches the count of 631, comparator 24 generates intermediate vertical synchronizing signal $V_M$. This count of 631 is seen to be equal to 315.5(H)/2. Likewise, during the next following field interval commencing with vertical synchronizing signal $V_{s2}$, comparator 24 generates the intermediate vertical synchronizing signal $V_{M1}$ when counter 20 reaches the count of 627. As mentioned above, the count of 627 defines an interval equal to 313.5(H)/2.

By mixing the received vertical synchronizing signal $V_s$ with the generated intermediate vertical synchronizing signal $V_M$, the resultant double-rate vertical synchronizing signals of twice the conventional repetition rate are not subject to the same large variations from subfield interval to subfield interval, as was shown in FIG. 5B. Rather, each intermediate vertical synchronizing signal is positioned substantially in the middle of each conventional field interval. FIG. 10E illustrates the stream of vertical synchronizing signals whose repetition rate is twice the conventional rate and which are spaced apart by the intervals 313.5(H)/2, 315.5(H)/2, 315.5(H)/2, 313.5(H)/2, and so on. Since the intervals between these vertical synchronizing signals do not vary substantially, the opposite of what was shown in FIG. 5B, vertical jitter is minimized. Thus, both line flicker and vertical jitter are significantly reduced in accordance with the present invention.

Figure 7C:
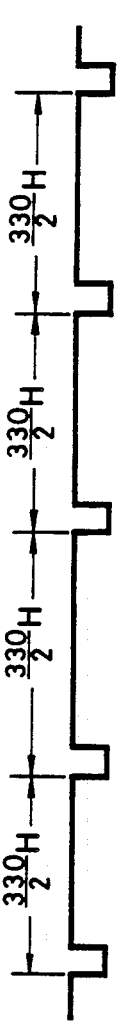

It will be seen that the reduction in vertical jitter achieved by the embodiment shown in FIG. 9 for a video signal reproduced by a video recorder operating in its slow motion or still motion mode also may be achieved when that recorder operates in its forward or reverse scan modes. FIG. 6C illustrates the double-rate vertical synchronizing signals which are produced when the video recorder operates in its forward scan mode. FIG. 7C illustrates the double-rate vertical synchronizing signals which are produced when the recorder operates in its reverse scan mode. In the interest of brevity, a brief description of the manner in which the apparatus shown in FIG. 9 operates to produce these vertical synchronizing signals is now provided. A comparison between the waveform obtained by the apparatus of FIG. 9 (as shown in FIG. 6C) and the waveform obtained by the previously proposed flicker reduction (shown in FIG. 6B) demonstrates the improvement achieved by the present invention wherein the vertical synchronizing signals are uniformly spaced. A similar conclusion is reached by comparing the waveforms shown in FIG. 7C with those shown in FIG. 7B. Thus, the present invention minimizes vertical jitter in the flicker-corrected video signal, that is, the video signal whose field repetition rate is twice the conventional field repetition rate.

Figure 11:
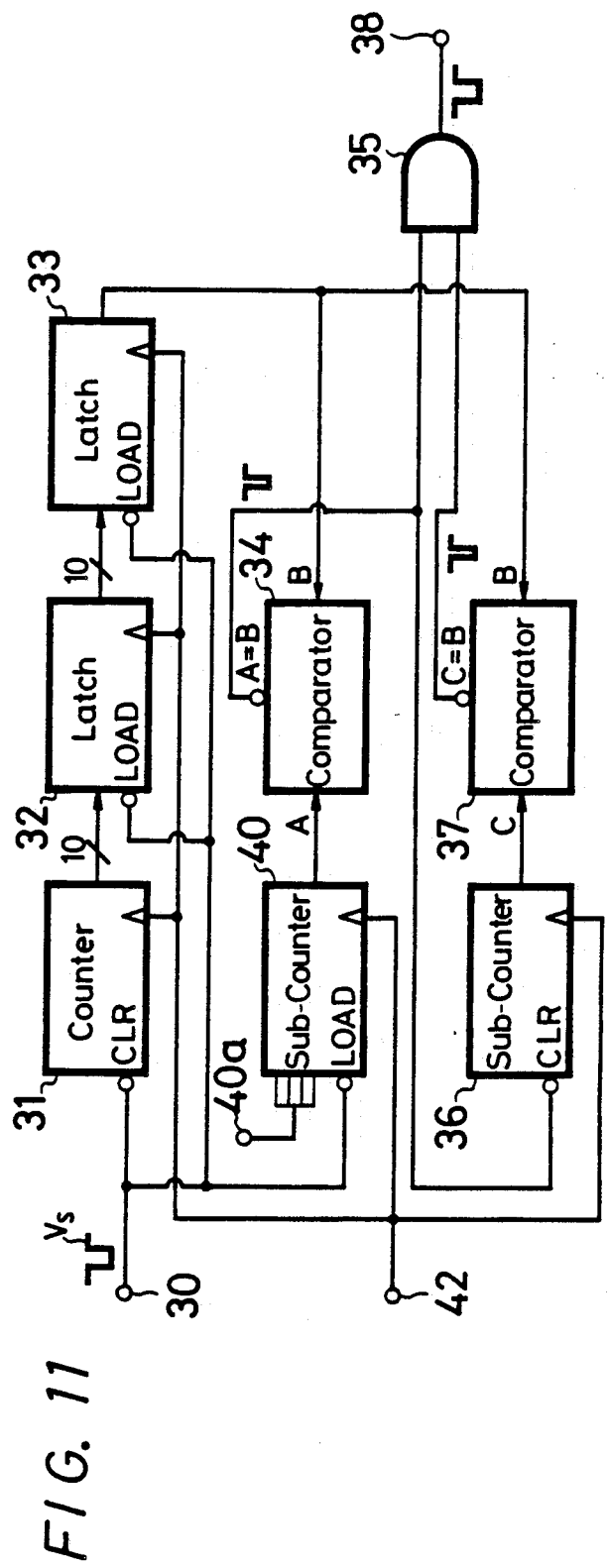
FIG. 11 is a block diagram of yet another embodiment of the present invention.

Yet another embodiment of the present invention is illustrated in FIG. 11. This embodiment generates uniform vertical synchronizing signals similar to that generated by the apparatus shown in FIG. 9 and, in addition, inserts an offset into the vertical synchronizing signals such that any head-switching signal that may be present in the video signal reproduced from the video recorder is positioned in the overscan area of the video signal so as not to interfere with the reproduced video picture. That is, the embodiment shown in FIG. 11 positions the head-switching signals S, shown in FIGS. 8A and 8B, in those line intervals which do not contain useful video information.

The apparatus shown in FIG. 11 is substantially similar to that shown in FIG. 9, and includes a counter 31 and latch circuits 32 and 33 which are substantially similar to aforedescribed counter 19 and latch circuits 21 and 23, respectively. The FIG. 11 embodiment also includes another counter 40 and a comparator 34 which are similar to aforedescribed counter 20 and comparator 24. It should be noted herein that counter 40 differs from counter 20 in that it includes a preset input 40a adapted to be supplied with a predetermined count in response to the vertical synchronizing signal $V_S$. That is, whereas counter 20 was cleared, or reset, in response to a vertical synchronizing signal, counter 40 is preset to a predetermined count in response to this vertical synchronizing signal.

The embodiment of FIG. 11 also includes another counter 36 and an additional comparator 37 which are similar to aforedescribed counter 20 and comparator 24. Counter 36 includes a clear, or reset input coupled to the output of comparator 34 and adapted to receive the intermediate vertical synchronizing signal generated by that comparator. Counter 36 also is coupled to a clock terminal 42 to receive and count clock signals of frequency $4f_H$.

Comparator 37 is coupled to counter 36 and to latch circuit 33 and is adapted to sense when count C of counter 36 is equal to the count B stored in latch circuit 33.

An AND gate 35 is coupled to comparators 34 and 37, respectively. This AND gate serves as a mixing circuit to combine output pulses produced by the comparators into a stream of vertical synchronizing signals.

The manner in which the embodiment shown in FIG. 11 operates now will be described in conjunction with the waveforms shown in FIGS. 12A–12F. The vertical synchronizing signals $V_s$ shown in FIG. 12A are supplied to clear counter 31 and to load counter 40 with a preset count. As a numerical example, this preset count is equal to 20. Since counter 40 counts clock signals of frequency $4f_H$, this count of 20 is equivalent to five horizontal line intervals.

As before, counter 31 counts the clock signals supplied thereto from clock terminal 42. Upon the occurrence of the next vertical synchronizing signal, a count equal to one-half the count accumulated by counter 31 is loaded into latch circuit 32 (FIG. 12B) and the count which had been stored in latch circuit 32 is transferred to latch circuit 33 (FIG. 12C). Let it be assumed that, following this transfer of counts, the count stored in latch circuit 33 is equal to 625. The vertical synchronizing signal loads counter 40 with the preset count of 20 and, thereafter, this counter counts the clock signals. It is appreciated that, after 605 clock signals have been counted, the count present in counter 40 is equal to 605 + 20 = 625. Comparator 34 senses that the count now present in counter 40 is equal to the count stored in latch circuit 33 to produce the intermediate vertical synchronizing signal $V_M$. As shown in FIG. 12D, this intermediate vertical synchronizing signal is offset by twenty clock signals from the center of the field interval defined by vertical synchronizing signals $V_S$.

Since the intermediate vertical synchronizing signal is assumed to be a negative-going pulse, AND gate 35 passes this pulse to output terminal 38.

This intermediate vertical synchronizing signal $V_M$ also is supplied to counter 36 to reset this counter to, for example, a count of zero. Once reset, counter 36 counts the clock signals supplied to clock terminal 42. It will be recognized that counter 36 is reset during the middle portion of the field interval and, thus, at this time, there has been no change in the count stored in latch circuit 33. In the present example, it is assumed that this count is 625.

Following the resetting of counter 36 in response to the intermediate vertical synchronizing signal $V_M$, when this counter attains a count of 625, comparator 37 senses that the count of counter 36 is equal to the count stored in latch circuit 33. Hence comparator 37 generates an output pulse which is assumed to be negative-going and, thus, is passed by AND gate 35 to output terminal 38. FIG. 12E illustrates the output pulses generated by comparator 37. Since the intermediate vertical synchronizing signal $V_M$ had been shifted, or offset, by a count of twenty (equal to 5H), and since one-half of the field interval is equal to a count of 625, it is seen that the output pulses $V'_s$ generated by comparator 37 are offset by a count of twenty (or 5H) from the received vertical synchronizing signals $V_s$.

AND gate 35 serves to mix the intermediate offset vertical synchronizing signals $V_M$ with the offset vertical synchronizing signals $V'_s$ to produce the stream of offset vertical synchronizing signals of twice the field repetition rate, as shown in FIG. 12F. Thus, these offset vertical synchronizing signals are uniformly spaced, are twice the conventional repetition rate and define subfield intervals equal to 312.5 H' (wherein H' = H/2). By offsetting, or timebase shifting, the vertical synchronizing signals of twice the conventional repetition rate, that is, by providing an offset to the double-rate vertical synchronizing signals, the presence of a head-switching signal, such as shown in FIGS. 8A and 8B, occurs during those line intervals which do not contain useful video information. That is, the head-switching signal occurs during the overscan area of the double-rate video signal. It is appreciated that, although the vertical and horizontal repetition rates of the flicker-reduced video signal are increased, the location of the head-switching signal remains fixed in position relative to the normal video field, as shown in FIG. 8B. But, by shifting the times of occurrence of the double-rate vertical synchronizing signals, the head-switching signal now is present in the overscan, or non-picture, portion of the video signal whose field repetition rate has been doubled.

Although not described herein, it is appreciated that when the embodiment shown in FIG. 11 is used with a video signal reproduced by a video recorder operated in its still motion, slow motion, forward scan, reverse scan or other special playback modes of operation, the problem of vertical jitter is minimized, as was discussed above in conjunction with the embodiment shown in FIG. 9. Thus, both vertical jitter and head-switching interference are substantially reduced by the embodiment shown in FIG. 11.

While the present invention has been particularly shown and described with reference to a preferred embodiment, it will be readily appreciated by those of ordinary skill in the art that various changes and modifications may be made without departing from the spirit and scope of the invention. For example, in the embodiments shown in FIGS. 9 and 11, rather than eliminating the least significant bit from the count attained by counter 19 or 31, and loading the thus-modified count in latch circuit 21 or 32, the repetition rate of the clock signals supplied to the counter may be halved, as by a separate divide-by-two circuit coupled to the clock input of this counter, resulting in a count equal to half the clock signals produced during a field interval.

Another alternative embodiment to the construction shown in FIG. 11 contemplates a single counter and a single comparator rather than the use of two counters 40 and 36 and two comparators 34 and 37. For example, the single counter may be provided with a preset input to which is supplied a preset count of twenty (or other desired preset count) when vertical synchronizing signal $V_s$ is present, and to which is supplied a preset count of zero when the intermediate vertical synchronizing signal $V_M$ is present. Thus, this counter may be selectively loaded with one preset count during the first half of a field interval and then loaded with another preset count (assumed herein to be zero) at the beginning of the next portion of the field interval. The output of such a counter then may be compared to the count stored in latch circuit 33; and the pulse produced by the comparator when the compared counts are equal may be used both as the offset intermediate vertical synchronizing signal $V_M$ and the offset vertical synchronizing signal $V'_s$, shown in FIG. 12F.

As yet another alternative to the presently described invention, latch circuits 21 and 23, as well as latch circuits 32 and 33, may be formed as series-connected shift registers or two successive storage compartments in a conventional memory.

It is intended that the appended claims be interpreted as including the embodiments described herein, the alternatives mentioned above and all equivalents thereto.

What is claimed is:

1. Apparatus for generating intermediate vertical synchronizing signals which occur between vertical synchronizing signals normally included in a conventional video signal, comprising:
   a source of clock signals synchronized with horizontal synchronizing signals normally included in the conventional video signal;
   a source of vertical synchronizing signals normally included in the conventional video signal;
   first counter means supplied with said clock signals and said vertical synchronizing signals for providing a count representing the number of clock signals present in one-half of a field interval of said conventional video signal;
   temporary storage means for storing the count provided by said first counter means during a second preceding field interval;
   second counter means supplied with said clock signals and said vertical synchronizing signals for counting the number of clock signals present in said field interval; and
   comparator means for comparing the count of said second counter means with the stored count for generating an intermediate vertical synchronizing signal when the compared counts are substantially equal.

2. The apparatus of claim 1 wherein said clock signals exhibit a repetition rate that is a multiple of the repetition rate of said horizontal synchronizing signals.

3. The apparatus of claim 2 wherein said first counter means is enabled by a vertical synchronizing signal to count said clock signals; and wherein said temporary storage means includes a load input for receiving a vertical synchronizing signal to store a count derived from said first counter means.

4. The apparatus of claim 3 wherein said first counter means comprises an n-bit counter, and said temporary storage means receives an $(n-1)$ bit count from said n-bit counter; wherein the $(n-1)$ bit count is equal to the n-bit count less the least significant bit thereof.

5. The apparatus of claim 3 wherein said temporary storage means comprises first and second latch means, said first latch means being responsive to said vertical synchronizing signal to store the count derived from the count just reached by said first counter means and said second latch means being responsive to said vertical synchronizing signal to store the count which had last been stored in said first latch means.

6. The apparatus of claim 5 wherein said comparator means includes one input coupled to receive the count of said second counter means and another input coupled to receive the count stored in said second latch means.

7. The apparatus of claim 6 wherein said second counter means includes a clear input for receiving said vertical synchronizing signal to clear the count thereof.

8. The apparatus of claim 1 wherein said second counter means includes offset means responsive to said vertical synchronizing signals for providing a count offset to the number of clock signals counted thereby, whereby said comparator means generates an intermediate vertical synchronizing signal offset from the middle of the field interval of said conventional video signal; and clear means responsive to said intermediate vertical synchronizing signal to provide a reset count for said second counter means, whereby said comparator means generates an offset vertical synchronizing signal when said second counter means is incremented from said reset count to said stored count.

9. The apparatus of claim 8 wherein said second counter means comprises first and second sub-counters, each for counting said clock signals, said offset means comprises means responsive to a vertical synchronizing signal for loading a preset count into said first sub-counter, and said clear means comprises means responsive to said intermediate vertical synchronizing signal for resetting said second sub-counter.

10. The apparatus of claim 9 wherein said comparator means comprises a first comparator for comparing the count of said first sub-counter with the stored count for generating an intermediate offset vertical synchronizing signal, and a second comparator for comparing the count of said second sub-counter with the stored count for generating an offset vertical synchronizing signal.

11. The apparatus of claim 1 wherein said conventional video signal is a PAL television signal.

12. The apparatus of claim 1 wherein said conventional video signal is a SECAM television signal.

13. Apparatus for generating intermediate vertical synchronizing signals which occur between vertical synchronizing signals of a field interval normally included in a conventional video signal, the intermediate vertical synchronizing signals being offset from the middle of the field intervals, said apparatus comprising:
   a source of clock pulses synchronized with horizontal synchronizing signals normally included in the conventional video signal;
   a source of vertical synchronizing pulses normally included in the conventional video signal;
   first counter means supplied with said clock pulses and said vertical synchronizing pulses for counting the clock pulses which follow a vertical synchronizing pulse and for providing a count representing half the number of clock pulses in a field interval;

latch means for storing the count provided by said first counter means obtained during a preceding field interval;

presettable second counter means supplied with clock pulses and said vertical synchronizing pulses, said second counter means being preset to a preset count in response to a vertical synchronizing pulse and for counting the clock pulses which follow that vertical synchronizing pulse; and comparator means for comparing the count of said second counter means with the stored count for generating an intermediate vertical synchronizing signal offset from the middle of the field interval of the conventional video signal when the compared counts are substantially equal.

14. The apparatus of claim 13 further comprising offset means for producing an offset vertical synchronizing signal relative to the vertical synchronizing pulse included in the conventional video signal; and combining means for combining the intermediate vertical synchronizing signal and the offset vertical synchronizing signal to produce a stream of vertical synchronizing signals at a repetition rate twice the field repetition rate of the conventional video signal.

15. The apparatus of claim 14 wherein said offset means includes third counter means supplied with said clock pulses and said intermediate vertical synchronizing signal for counting the clock pulses which follow an intermediate vertical synchronizing signal; and second comparator means for comparing the count of said third counter means with the stored count for generating an offset vertical synchronizing signal when the compared counts are substantially equal.

16. The apparatus of claim 15 wherein the count stored in the latch means is obtained by said first counter means during a second preceding field interval.

17. The apparatus of claim 16 wherein said latch means comprises a first latch circuit having a load input responsive to a vertical synchronizing pulse for storing the count provided by said first counter means; and a second latch circuit having a load input responsive to a vertical synchronizing pulse for storing the count stored in the first latch circuit.

18. The apparatus of claim 17 wherein said first counter means is an n-bit counter and each of said latch circuits stores an $(n-1)$ bit count, the $(n-1)$ bit count being equal to the n-bit count less the least significant bit thereof.

19. The apparatus of claim 17 wherein the first-mentioned comparator means compares the count of said second counter means with the count stored in said second latch circuit.

20. The apparatus of claim 19 wherein the second comparator means compares the count of said third counter means with the count stored in said second latch circuit.

21. The apparatus of claim 13 wherein said conventional video signal is a PAL television signal.

22. The apparatus of claim 13 wherein said conventional video signal is a SECAM television signal.

* * * * *